United States Patent [19]

Nukui

[11] 4,133,494
[45] Jan. 9, 1979

[54] TAPE DRIVING APPARATUS

[75] Inventor: Katsuyoshi Nukui, Mitaka, Japan

[73] Assignee: Nippon Columbia Kabushikikaisha, Tokyo, Japan

[21] Appl. No.: 807,675

[22] Filed: Jun. 17, 1977

[30] Foreign Application Priority Data

Jun. 24, 1976 [JP] Japan .............................. 51-82995[U]
Mar. 19, 1977 [JP] Japan .................................. 52-30830

[51] Int. Cl.² ...................... B65H 59/38; G03B 01/04
[52] U.S. Cl. ..................................... 242/186; 242/203
[58] Field of Search ............... 242/186, 190, 191, 203, 242/206, 208; 360/69, 71, 73; 318/6, 7

[56] References Cited

U.S. PATENT DOCUMENTS

| 3,318,546 | 5/1967 | Bejach | 242/190 |
| 3,600,654 | 8/1971 | Yasutake | 318/6 |
| 3,805,127 | 4/1974 | Svendsen | 318/7 |
| 3,984,868 | 10/1976 | Ragle et al. | 360/73 |
| 4,015,177 | 3/1977 | Vaz Martins | 318/7 |

Primary Examiner—Leonard D. Christian

[57] ABSTRACT

A tape driving apparatus in which even if the radius of a magnetic medium such as a magnetic tape wound on a supply and/or take-up reel is varied, a current flowing in a servo motor coupled directly to a capstan, which is varied in accordance with a load, is utilized to make the speed of the servo-motor constant by controlling a reel motor and hence to make the back tension and take-up tension of the magnetic tape equal.

6 Claims, 12 Drawing Figures

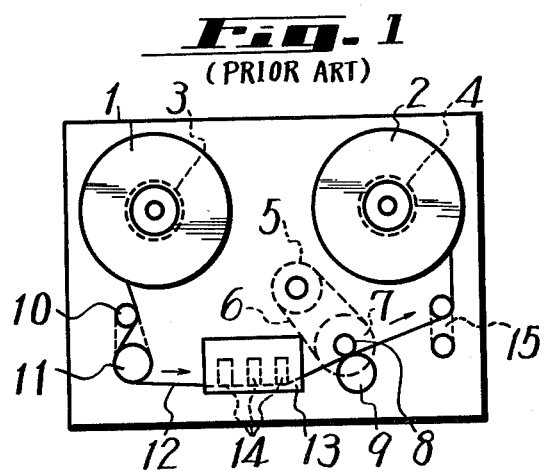
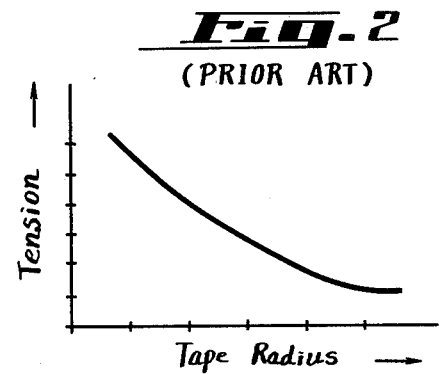
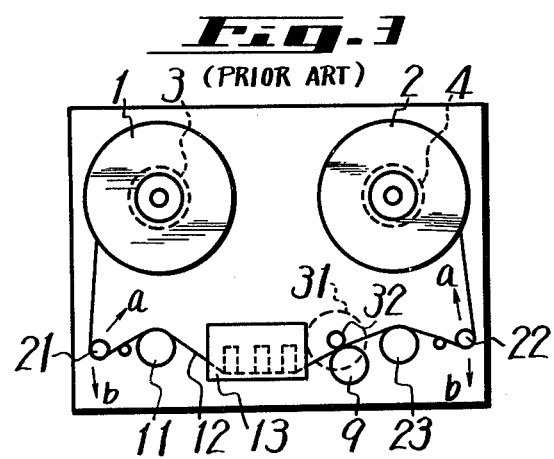
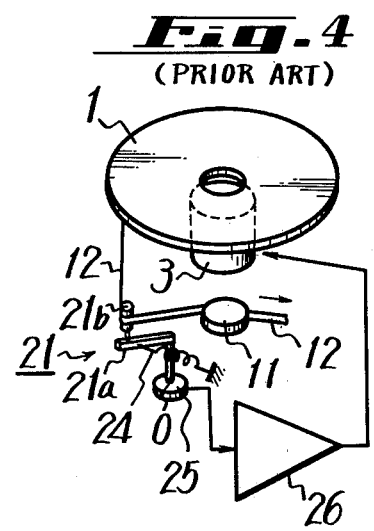
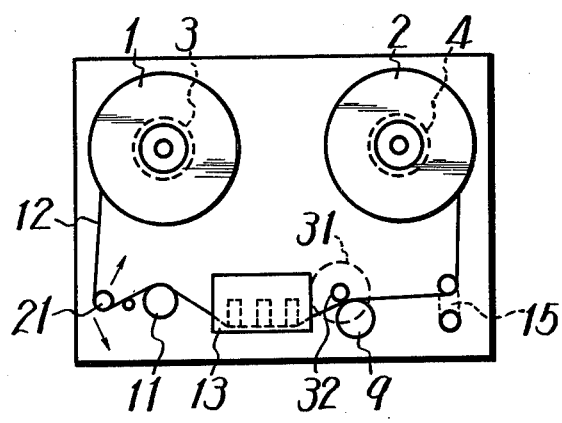
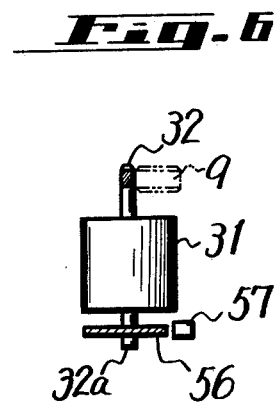

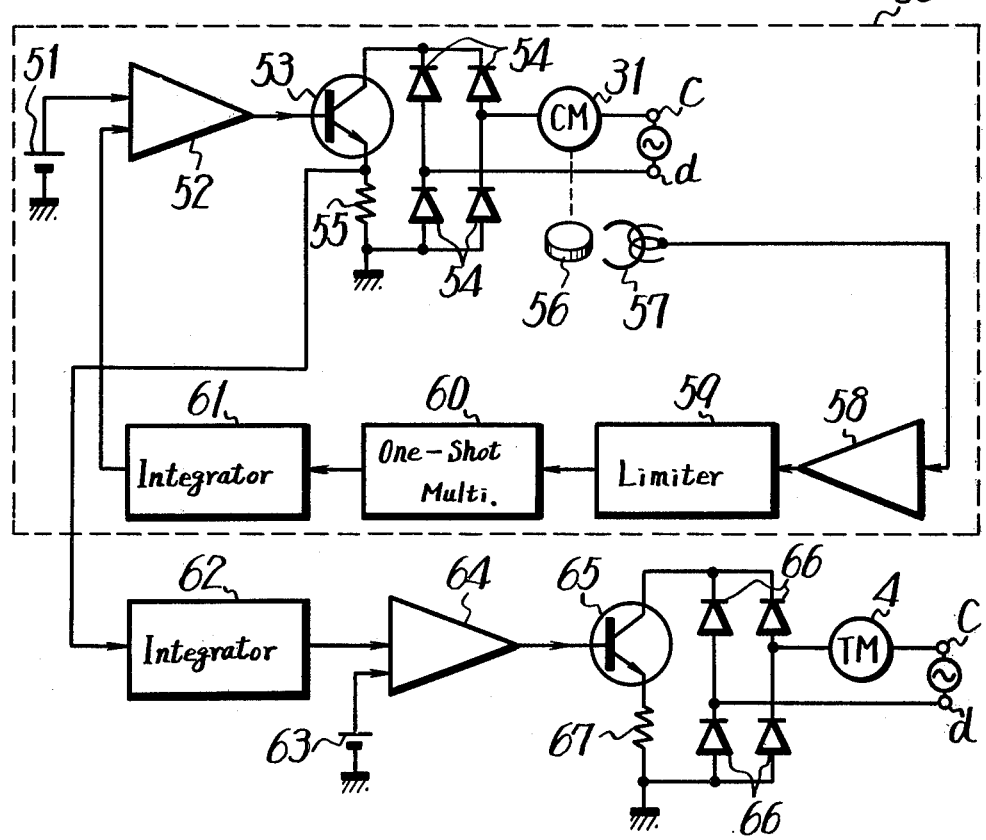
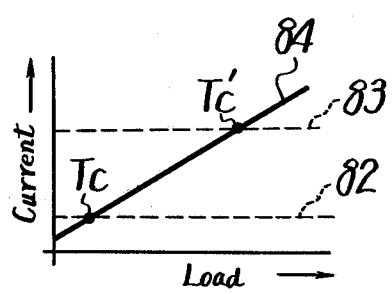
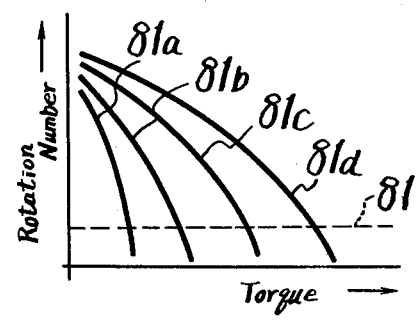

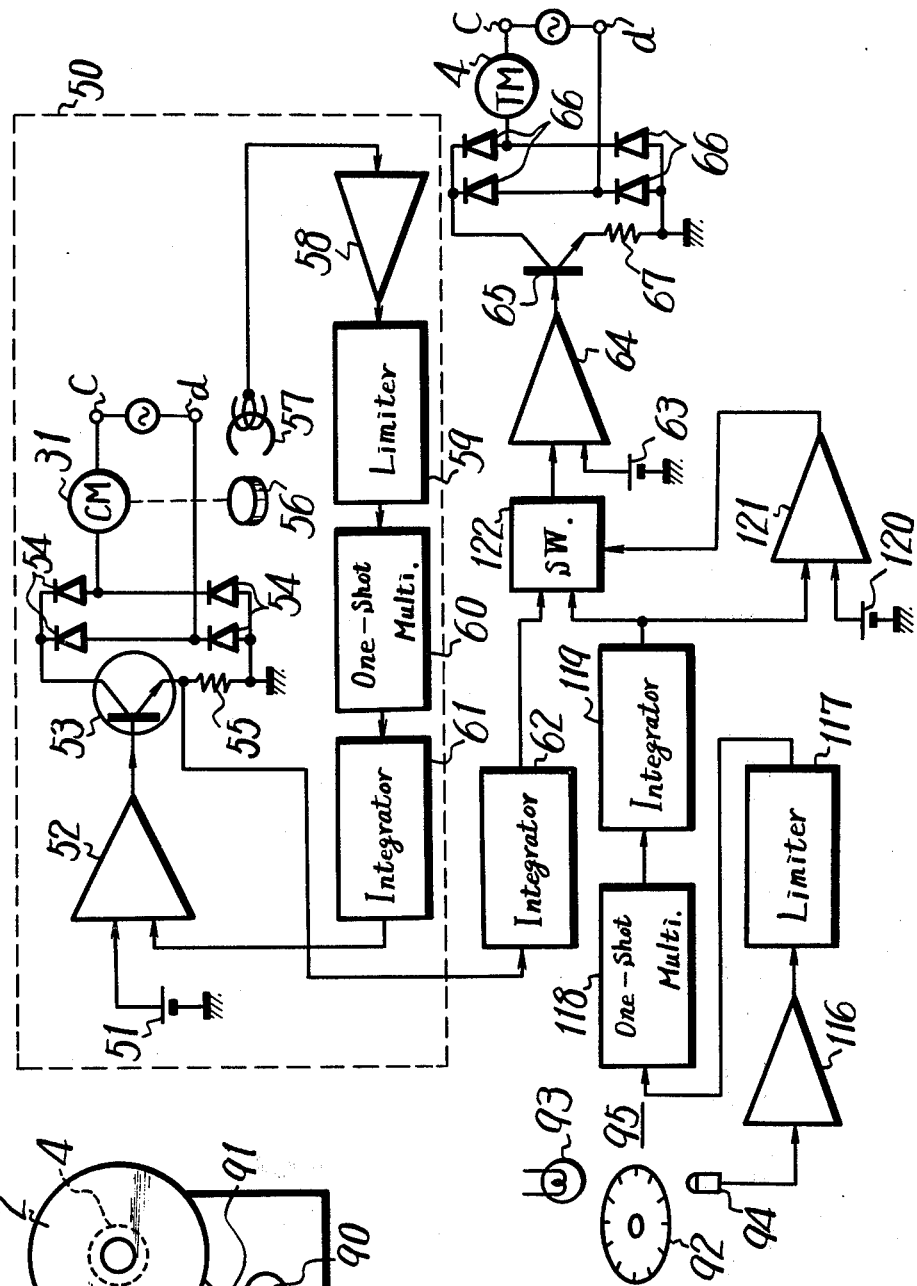
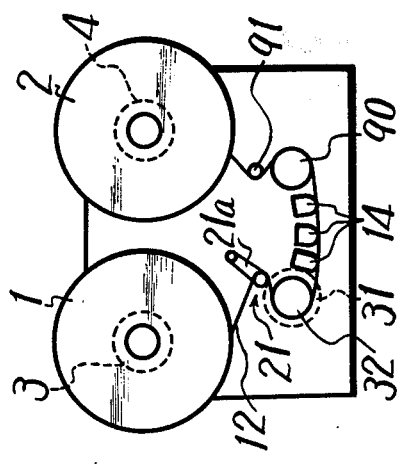
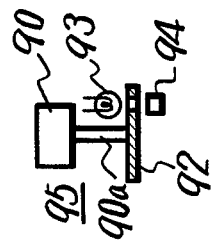

TAPE DRIVING APPARATUS

BACKGROUND OF THE INVENTION

1. Field of the Invention

The present invention relates generally to a tape driving apparatus for use with a magnetic recording and/or reproducing apparatus and is directed more particularly to a magnetic tape driving apparatus in which a capstan is controlled to be driven at a constant speed by a servo motor for the capstan, a speed change of the capstan is detected to control a voltage applied to a reel motor, and hence the tensions of the tape at tape supply and take-up sides are made substantially constant by servo-operation.

2. Description of the Prior Art

In the prior art tape driving apparatus, a supply reel motor coupled to a supply reel and a take-up reel motor coupled to a take-up reel are supplied with a control voltage in response to the tape tension of a magnetic tape detected by a tension arm to make the back and take-up tensions of the tape constant and to apply servo operation to the tape supply and take-up sides, which is constant irregardless of the variation of radii of the tape wound on the supply and take-up reels, whereby the variations of a tape travelling speed and of the head touch against the tape are avoided.

According to the prior art, however, it is impossible to make the back tension and take-up tension equal with each other regardless of any variation of the tape radii of the tape wound on the reels. Therefore, with the prior art the load for the capstan servo motor is varied to cause a speed variation thereof. Further, in the prior art it is necessary to provide a tape tension detector at the tape supply and take-up sides, respectively, so that the apparatus becomes complicated in construction and expensive.

OBJECTS AND SUMMARY OF THE INVENTION

It is an object of the invention to provide a novel tape driving apparatus free from the defects inherent to the prior art.

It is another object of the invention to provide a tape driving apparatus with which the back and take-up tensions of a magnetic tape can be made constant regardless of variation of the radii of tape wound on the supply and take-up reels so that the load to a capstan becomes constant and the servo control can be applied to a capstan servo motor with stability.

It is a further object of the invention to provide a tape driving apparatus in which a single tape tension detector is used to servo-control the back and take-up tensions of the tape.

It is a still further object of the invention to provide a tape driving apparatus in which a current flowing through a servo motor, directly coupled to a capstan and varied in response to the variation of a load, is used to control the supply and/or take-up reel motor so as to make the current flowing through the servo motor constant.

According to an aspect of the invention there is provided a tape driving apparatus which comprises a reel motor for driving a supply reel on which a magnetic tape is wound, a capstan for transporting said tape at a constant speed, a servo motor for driving said capstan, a reel motor for driving a take-up reel which takes up said tape, a control circuit for controlling a current flowing through said servo motor to be substantially constant, and a control circuit for controlling a voltage applied to at least one of said reel motors in accordance with variation of said current flowing through said servo motor.

The other objects, features and advantages of the present invention will become apparent from the following description taken in conjunction with the accompanying drawings through which like reference numerals designate like elements.

BRIEF DESCRIPTION OF THE DRAWINGS

FIG. 1 is a plan view showing an example of the prior art magnetic recording and/or reproducing apparatus;

FIG. 2 is a graph explaining the operation of apparatus shown in FIG. 1;

FIG. 3 is a plan view showing another example of the prior art magnetic recording and/or reproducing apparatus;

FIG. 4 is a perspective view showing a part of FIG. 3 in enlarged scale;

FIG. 5 is a plan view showing a magnetic recording and/or reproducing apparatus provided with an example of the tape driving apparatus according to the present invention;

FIG. 6 is a side view showing a part of FIG. 5 in enlarged scale;

FIG. 7 is a diagrammatic view showing the invention used in the apparatus shown in FIG. 5;

FIGS. 8 and 9 are graphs used for explaining the operation of the invention;

FIG. 10 is a plan view showing a magnetic recording and/or reproducing device in which another example of the invention is used;

FIG. 11 is a side view showing a detail of FIG. 10; and

FIG. 12 is a diagrammatic view of another example of the invention shown in FIG. 10.

DESCRIPTION OF THE PREFERRED EMBODIMENTS

In order to better understand the present invention, the prior art tape driving apparatus will be firstly described briefly.

A first prior art tape driving apparatus will be now described with reference to FIG. 1 which shows a prior art magnetic recording and/or reproducing apparatus. In the figure, 1 designates a tape supply reel which is driven by a supply reel motor 3 directly, while a tape take-up reel 2 is driven by a take-up motor 4 directly. A capstan 8 is driven by a synchronous motor 5 through a belt 6 stretched between the synchronous motor 5 and a fly-wheel 7 coupled to the capstan 8. A magnetic tape 12 is transported from the supply reel 1 to the take-up reel 2 through a tension arm 10, a stabilizer 11, a head housing 13, in which magnetic heads 14 are held, gripped between the capstan 8, which is rotated at a constant speed, and a pinch roller 9 and through a tension arm 15.

In order to insure that tape 12 makes contact with the heads 14 through a sufficient back tension, the supply reel motor 3 is provided with a voltage and rotated in the clockwise direction in FIG. 1, while the take-up motor 4 is supplied with a voltage and rotated in the counter clockwise direction so as to take up the tape 12.

With the above prior art example shown in FIG. 1, since the voltages applied to the supply motor 3 and take-up motor 4 are constant, the tape tension is varied in accordance with the radii of tape 12 wound on supply and take-up reels 1 and 2. This variation of tape tension is shown in the graph of FIG. 2, in which the ordinate represents the tape tension and the abscissa represents the radius of tape 12 on the reels. As may be apparent from the graph of FIG. 2, as the radius of tape 12 increases the tape tension decreases. By way of example, when a reel of 7 inches is replaced with a reel of 10 inches, the tape tension decreases. Thus, with such a change of reels, voltages applied to the reel motors are changed. In spite of such a voltage change, the change of tape tension between the inner most and outer most of the reel is about three times, so that the travelling speed of tape, which should be constant, is changed. This change of tape speed is caused by the fact that the tape 12 gripped between capstan 8 and pinch roller 9 varies in thickness and slides due to the tape tension change. Further, since the heads 14 are forced with a tension greater than a necessary value by the tape 12, the heads 14 are much abraded. And, due to insufficient tape tension on the heads 14 there occurs a drop-out.

Another prior art apparatus free from the defects of the above example will be now described with reference to FIGS. 3 and 4 in which the same reference numerals as those of FIG. 1 designate the same elements and their description will be omitted for the sake of brevity. In the second prior art example, the supply motor 3 coupled to supply reel 1 is provided with a control voltage in accordance with the tape tension of magnetic tape 12 detected by a tension servo mechanism 21 to keep the back tension of tape 12 constant, while the take-up motor 4 coupled to take-up reel 2 is supplied with a control voltage in accordance with the tension of tape 12 detected by another tension servo mechanism 22 to keep the take-up tension of tape 12 constant. In general, the back tension and take-up tension of tape 12 are selected substantially equal.

As shown in FIG. 4 which shows a part of FIG. 3 viewed from the side, the tension servo mechanism 21 which includes a roller 21b rotatably supported on an arm 21a. The arm 21a can be rotatable by about 30° in the directions indicated by arrows a and b in FIG. 3 with its shaft o as the center. A potentiometer 25 is attached to the shaft o to detect the rotation angle thereof and to produce the corresponding electric signal, and a spring 24 is stretched beween the arm 21a and a fixed part to bias the arm 21a always in the direction of arrow b and to balance the moment, which is caused by tape 12 and rotates the arm 21a in the direction of arrow a, with the moment, which is caused by spring 24 and rotates the arm 21a in the direction of arrow b.

When the radius of tape 12 wound on reel 1 is changed and arm 21a is displaced or rotated, the potentiometer 25 detects this rotation and supplies the corresponding electric signal through an amplifier 26 to supply motor 3. Thus, the supply motor 3 is controlled to make the tension of tape 12 constant.

The tension servo mechanism 22 at the tape take-up side is similar to the above tension servo mechanism 21 in construction and operation, so that the take-up motor 4 is controlled by the tension servo mechanism 22 similarly.

The capstan 32 is itself the rotational shaft of a servo motor 31 so as to avoid the influences from a belt, vibration of synchronous motor or power source frequency, and this servo motor 31 is servo-controlled by the constant tension for the variation of the radii of tape 12 wound on the supply and take-up reels so as to avoid the variations of head contact with the tape and tapes speed.

With the second example of the prior art, however, it is impossible to keep the back and take-up tensions equal irrespective of the variation of radii of tape 12. In fact, due to the abrasion of the bearings of the tension servo mechanism 21 and 22 and the definite amplification factor of the servo system, the tension of tape 12 is varied, hence the load to the servo motor 31 is changed, and accordingly speed change is caused in the tape transportation.

Now, an example of the tape driving apparatus according to the invention free from the defects encountered in the prior art will be described with reference to FIGS. 5 to 9.

FIG. 5 is a plan view of a magnetic recording and/or reproducing apparatus provided with an example of the tape driving apparatus according to the present invention, in which the parts same as those of FIGS. 1 and 3 are marked with the same numerals and their description will be omitted. In the example of the invention shown in FIG. 5, an AC servo motor is used as servo motor 31 and capstan 32 is directly coupled to the rotational shaft of the servo motor 31.

As shown in FIG. 6 which is a side view of servo motor 31, a wheel 56 is attached to the rotating shaft 32a of servo motor 31, which extends downwards. Magnetic powders are coated on the outer periphery of wheel 56 on which pulse signals are recorded. The recorded pulse signals are picked up by a magnetic head 57.

The pulse signal picked-up by head 57 is supplied to an amplifier 58 of a servo circuit 50 shown in FIG. 7. The amplified pulse signal is fed to a limiter 59 so as to remove amplitude-variation components thereof, and then to a one-shot multivibrator 60. The output from the one-shot multivibrator 60 is fed to an integrator 61 whose output signal is fed to one input terminal of a comparator 52. A reference voltage from a reference voltage source 51, which corresponds to a predetermined tape speed, is fed to the other input terminal of the comparator 52 whose compared output is fed to the base of a transistor 53 to control its conduction degree. For example, when the detected output is higher than the reference voltage or the rotating speed of capstan 32 is high, the transistor 53 is controlled to decrease its conduction degree, while when the speed of capstan 32 is low, the transistor 53 is controlled to increase its conduction degree. A resistor 55 is connected between the emitter of transistor 53 and the ground to stabilize the temperature characteristics and amplification degree of transistor 53. The servo motor 31 is inserted between AC voltage source terminals c and d through rectifying diodes 54 which is connected to transistor 53. Thus, servo motor 31 is controlled to be rotated at low or high speed as the conduction degree of transistor 53 decreases or increases.

Thus, the servo motor 31 can be kept constant at its speed as indicated by a dotted line 81 in the graph of FIG. 9 which shows the torque-RPM characteristics of servo motor 31. In the graph of FIG. 9, the ordinate represents the RPM of servo motor 31, the abscissa represents the torque and curves 81a, 81b, 81c and 81d are torque-rotation characteristics with voltage as parameter, respectively. In this case, the voltages increase in the order of 81a to 81d sequentially.

The current flowing through servo motor 31 changes as its load changes as shown in the graph of FIG. 8 in which the ordinate represents the current of servo motor 31 and the abscissa represents the load thereto. That is, if the load is light the current is small, but if the load is heavy the current is great.

With the present invention, the back tension to the supply reel motor 3 is controlled by servo mechanism 21, and the take-up reel motor 4 is controlled so as to make the current flowing in the servo motor 31 constant, namely to make the voltage across resistor 55 constant, whereby the take-up tension is made equal to the back tension. To this end, as shown in FIG. 7, the voltage across resistor 55, which contains ripple components of power source frequency, is fed to an integrator or integration circuit 62 to be integrated and the output from integration circuit 62 is supplied to one input terminal of a comparator 64 which is supplied, at its other input terminal, with a reference voltage from a reference voltage source 63 which is in accordance with the back tension. The output from comparator 64 is fed to the base of a transistor 65 to control its conduction degree and hence to control the voltage applied to take-up reel motor 4 connected between AC power source terminals c and d through rectifying diodes 66. A resistor 67 is connected between the emitter of transistor 65 and the ground in a manner similar to that of the resistor 55.

In the graph of FIG. 8 whose ordinate represents the current of servo motor 31 and whose abscissa represents the load thereto, a solid line 84 represents the load-current characteristic of the servo motor 31 when servo control is applied to the servo motor 31. In the case where the take-up and back tensions are equal, a current, which flows through servo motor 31 to produce a torque, which makes capstan 32 supply magnetic tape 12, is very small and of such a value at an intersecting point $T_c$ of dotted line 82 and solid line 84. While, in the case where no voltage is applied to take-up reel motor 4, a current at an intersecting point $T_c'$ of dotted line 83 and solid line 84 is a current flowing through servo motor 31.

It is also possible that, for example, the tension servo for take-up reel motor 4 is carried out by tension servo system 21 and supply reel 3 is controlled by the variation of current flowing through the servo motor 31 to make current flowing through servo motor 31 constant.

Another example of the present invention will be described with reference to FIGS. 10 to 12 in which the same parts as those of FIGS. 5 and 7 are marked with the same numerals and their description will be omitted.

The second embodiment of the invention is adapted to a magnetic recording and/or reproducing apparatus of the type in which a pinch roller is not used so as to transport the tape by the friction between the tape and capstan to thereby avoid or reduce the deterioration of tape by wow, flutter and so on thereof.

In the second example of the invention, guide rollers 90 and 91 are provided in the tape path between heads 14 and take-up reel 4 as shown in FIG. 10. An opaque disc 92 with an aperture 92a is attached to a rotating shaft 90a of guide roller 90, and a light emitting device 93 such as a lamp and a light receiving device 94 such as photo-electric converting element, which form a tape speed detecting device 95, are provided by gripping disc 92 for converting device 94 to receive light from device 93 through aperture 92a and to produce an electric pulse signal with repeating frequency in response to the tape speed, as shown in FIG. 11.

The pulse signal from the tape speed detector 95 is fed to an amplifier 116 shown in FIG. 12. The output signal from amplifier 116 is fed to a limiter 117 to be wave-shaped and then to one-shot multivibrator 118 to drive the same. The output of multivibrator 118 is integrated by an integrator or integration circuit 119 to produce a DC voltage whose amplitude is in proportion to the rotation speed of disc 92 or guide roller 90. The DC voltage from integrator 119 is fed through a switching circuit 122 to one input terminal of a comparator 64 whose other input terminal is supplied with a DC voltage from a DC voltage source 63 which corresponds to a predetermined rotation speed. The output from comparator 124 is applied to the base of transistor 65 to control its conduction degree and hence to apply servo control to the take-up reel motor 4 through the rectifying circuit of diodes 66 similar to the first example described in connection with FIG. 7.

As shown in FIG. 12, the servo motor 4 is also servo-controlled by the output of integrator 62. In order to change the outputs of integrators 62 and 119, the switching circuit 122 is switched by the following manner. That is, the output of integrator 119 is applied to one input terminal of a comparator 121 whose other input terminal is supplied with a DC voltage from a DC voltage source 120 which corresponds to a predetermined switching level. The output of comparator 121 is fed to switching circuit 122, so that the reel motor 4 is servo-controlled by the output of tape speed detecting device 95 until the tape speed increases to nearly predetermined speed, while the reel motor 4 is servo-controlled by the current flowing through the servo motor 31 when the tape speed arrives at the predetermined speed.

A window comparator is used as comparator 121 to change the servo control of reel motor 4 by the current for servo motor 31 to the servo control by the output of tape speed detecting device 95 when the tape speed becomes higher or lower than the predetermined speed by certain reasons (for example, there occur slipping between capstan 32 and tape 12) and hence to make the tape speed in synchronism with the predetermined speed.

The guide roller 90 serves also as an impedance roller to filter out the vibrations (whose frequency is mainly 100 $H_z$) generated from reel motor 4.

As described above, according to the present invention, the current flowing through the servo motor 31 is detected so as to make it constant irrespective of the radius of tape wound on the reels and to control the voltage applied to the reel motor, so that the tape tension can be made constant.

Further, when no pinch roller is used, only a small load may be applied to the capstan irrespective of the radius of the tape wound on the reels, so that the tape can be transported stably even if the friction coefficient between the capstan and tape.

With the present invention in the case that the tension control is carried out, only one tension detecting device is used for achieving the servo control for the back tension and take-up tension, so that the tape driving apparatus of the invention can be made inexpensive and is superior in property.

It will be apparent that many modifications and variations could be effected by one skilled in the art without departing from the spirits or scope of the novel concepts of the invention, so that the scope of the invention should be determined by the appended claims only.

I claim as my invention:

1. A tape driving apparatus, comprising:
   (a) a reel motor for driving a supply reel on which a magnetic tape is wound;
   (b) a capstan for transporting said tape at a constant speed;
   (c) a servo motor for driving said capstan;
   (d) a reel motor for driving a take-up reel which takes up said tape;
   (e) a first control means for controlling the speed of said servo motor to maintain said speed substantially constant; and
   (f) a second control means for controlling the voltage applied to at least one of said reel motors to maintain the current flowing through said servo motor substantially constant.

2. A tape driving apparatus as claimed in claim 1, in which said second control means includes means for comparing an output of said first control means with a reference value to carry out the controll of the voltage applied to said at least one of said reel motors with an output of said comparing means.

3. A tape driving apparatus as claimed in claim 2, in which said second control means includes a first detecting means for detecting a current flowing through said servo motor, a detected current being applied to said comparing means to be compared with said reference valve.

4. A tape driving apparatus according to claim 3, further comprising a switching means inserted between said first detecting means and said comparing means for cutting off said detected current upon start.

5. A tape driving apparatus as claimed in claim 4, further comprising a third control means including a second detecting means for detecting a speed of said tape and operating said switching means to control at least one of said reel motors.

6. A tape driving apparatus as claimed in claim 5, in which said third control means includes a comparing means for comparing an output of said second detecting means with a reference value.

* * * * *